United States Patent
Deline et al.

(10) Patent No.: US 8,342,199 B2
(45) Date of Patent: Jan. 1, 2013

(54) DISPENSING EQUIPMENT UTILIZING CORIOLIS FLOW METERS

(75) Inventors: Jonathan E. Deline, Oak Ridge, NC (US); Ryan C. Garrett, Randelman, NC (US); Michael C. Liebal, Greensboro, NC (US); Edward Payne, Greensboro, NC (US); Brent K. Price, Winston-Salem, NC (US); Rodger K. Williams, Siler City, NC (US); Zhou Yang, Oak Ridge, NC (US)

(73) Assignee: Gilbarco, Inc., Greensboro, NC (US)

( * ) Notice: Subject to any disclaimer, the term of this patent is extended or adjusted under 35 U.S.C. 154(b) by 713 days.

(21) Appl. No.: 12/477,592

(22) Filed: Jun. 3, 2009

(65) Prior Publication Data
US 2010/0139782 A1   Jun. 10, 2010

Related U.S. Application Data

(60) Provisional application No. 61/058,543, filed on Jun. 3, 2008.

(51) Int. Cl.
*G05D 11/00* (2006.01)
*B65B 31/00* (2006.01)

(52) U.S. Cl. ...... 137/15.04; 137/1; 137/87.03; 137/239; 73/861.356; 141/45

(58) Field of Classification Search .......... 137/239, 137/240, 87.03, 486, 487.5, 1, 15.04; 73/1.34, 73/1.16, 861.354, 861.356; 141/45
See application file for complete search history.

(56) References Cited

U.S. PATENT DOCUMENTS

| | | |
|---|---|---|
| 4,706,636 A | 11/1987 | Davis |
| 4,831,866 A | 5/1989 | Forkert et al. |
| 4,891,991 A | 1/1990 | Mattar et al. |
| 5,029,100 A | 7/1991 | Young et al. |
| 5,040,577 A | 8/1991 | Pope |
| 5,455,781 A | 10/1995 | Reynal et al. |
| 5,630,528 A | 5/1997 | Nanaji |

(Continued)

FOREIGN PATENT DOCUMENTS

DE     102006013826 A1     9/2007
(Continued)

OTHER PUBLICATIONS

International Search Report and Written Opinion of the International Search Authority dated Aug. 14, 2009, corresponding PCT Application No. PCT/US2009/046171, International Filing Date Jun. 3, 2009.

(Continued)

*Primary Examiner* — Kevin Lee
(74) *Attorney, Agent, or Firm* — Nelson, Mullins, Riley & Scarborough LLP

(57) ABSTRACT

An apparatus for dispensing liquid fuel comprises a plurality of inlet valves, each connected in-line with a respective inlet pipe in fluid communication with a respective source of a specific liquid fuel. A plurality of outlet valves are also provided, each connected in-line with a respective outlet pipe. A respective fuel hose is in fluid communication with each of the outlet pipes. The apparatus further comprises a coriolis flow meter located between the inlet valves and outlet valves, the coriolis flow meter providing a flow signal indicative of flow therethrough. A controller is operative to receive the flow signal and control the valves such that selected inputs of specific liquid fuels are dispensed to at least one of the fuel hoses. In accordance with an exemplary embodiment, the selected inputs of specific liquid fuels may include individual liquid fuels and blended combinations thereof. For example, the specific liquid fuels may include at least two of the following: a first octane gasoline, a second octane gasoline, diesel fuel, biodiesel and ethanol.

18 Claims, 8 Drawing Sheets

U.S. PATENT DOCUMENTS

| | | | |
|---|---|---|---|
| 5,661,232 | A | 8/1997 | Van Cleve et al. |
| 5,927,321 | A * | 7/1999 | Bergamini ............... 73/861.354 |
| 6,253,779 | B1 | 7/2001 | Nanaji et al. |
| 6,439,253 | B1 * | 8/2002 | Easton ........................ 137/486 |
| 6,672,340 | B2 | 1/2004 | Mutter |
| 6,935,191 | B2 | 8/2005 | Olivier et al. |
| 6,941,978 | B2 | 9/2005 | Riffle |
| 7,028,528 | B2 | 4/2006 | Antonijevic |
| 7,287,438 | B2 | 10/2007 | Van Cleve |
| 7,472,606 | B2 | 1/2009 | Seddon et al. |
| 2002/0029641 | A1 | 3/2002 | Larsson |
| 2005/0044929 | A1 | 3/2005 | Gysling et al. |
| 2005/0229716 | A1 | 10/2005 | Unsworth et al. |
| 2008/0295568 | A1 | 12/2008 | Nanaji et al. |

FOREIGN PATENT DOCUMENTS

| | | |
|---|---|---|
| JP | 10170315 A | 6/1998 |
| WO | 0044666 A1 | 8/2000 |
| WO | 2008/013545 A1 | 1/2008 |

OTHER PUBLICATIONS

Gilbarco Inc., SK700-II is now available with AdBlue(TM), Press Release, Gilbarco Inc., http://www.gilbarco.eu/en/press_5.aspx, Aug. 24, 2008.

Gilbarco Inc., Frequently Asked Questions: Gilbarco® Encore® S Diesel Exhaust Fluid (DEF) Dispenser, mikebuckmaster.com, http://mikebuckmaster.com/Documents/DEF%20FAQ.pdf. Oct. 2009.

Mike Antich, DEF: A New Variable in Truck Fleets, Work Truck Magazine, Bobit Business Media, United States, Jan.-Feb. 2010.

Supplementary Search report dated Dec. 13, 2011 for corresponding European Application No. 09759369.3.

Notification Concerning Transmittal of International Preliminary Report on Patentability (Chapter 1 of the Patent Cooperation Treaty) issued by International Bureau dated Dec. 16, 2010 regarding corresponding application No. PCT/US2009/046171.

* cited by examiner

DISPENSING EQUIPMENT UTILIZING CORIOLIS FLOW METERS

PRIORITY CLAIM

This application claims the benefit of provisional application Ser. No. 61/058,543, filed Jun. 3, 2008, which is relied upon and incorporated herein by reference in its entirety.

BACKGROUND OF THE INVENTION

The present invention generally relates to fuel dispensing equipment. More particularly, the invention relates to fuel dispensing equipment utilizing one or more coriolis flow meters.

Fuel pumps and fuel dispensers are known in the art. A fuel pump includes a pump located within its housing for extracting fuel from a fuel source, as well as meters for measuring fuel flow and switches and valves for controlling fuel flow. A fuel dispenser, in contrast, is connected to a source of fuel which contains its own pump, typically an underground storage tank (UST) with a submersible turbine pump (STP). Thus, a fuel dispenser does not typically require that a pump be housed in the unit itself. Instead, the dispenser housing contains the appropriate meters, switches and valves for controlling fuel flow supplied to it under pressure. As used herein, the term "fuel dispenser" or "dispensing equipment" shall include both fuel pumps and fuel dispensers, unless the context clearly indicates otherwise.

Fuel dispensers are designed in a variety of different configurations. A common type of fuel dispenser, often called a "lane-oriented" dispenser, has one or more fuel dispensing nozzles on each side of the unit. A lane-oriented multiproduct fuel dispenser typically has two or more fuel dispensing nozzles on each side of the unit. Each of the nozzles on each side of the unit is typically used to dispense a particular grade (e.g., octane level) of fuel. Alternatively, a single nozzle may be provided for dispensing multiple grades of fuel depending on the customer's selection. Each side of the unit generally includes a display for displaying the amount and cost of the fuel dispensed, and can also include credit or debit card verification and cash acceptance mechanisms.

A variety of different meters have been used in prior art fuel dispensers. Typically, either positive displacement meters or inferential meters have been used for this purpose. For a variety of reasons, fuel volume or flow rate measurement technologies are typically limited in their measurement accuracies across a finite range of flow rates. Additionally, measurement technologies may be limited in their maximum flow rates at the desired, restricted-to and/or otherwise realistic operating pressures by internal restrictions or fluidic impedances including but not limited to bore, port or other orifice size.

SUMMARY OF THE INVENTION

In accordance with one aspect, the present invention provides an apparatus for dispensing liquid fuel. The apparatus comprises a plurality of inlet valves, each connected in-line with a respective inlet pipe in fluid communication with a respective source of a specific liquid fuel. A plurality of outlet valves are also provided, each connected in-line with a respective outlet pipe. A respective fuel hose is in fluid communication with each of the outlet pipes.

The apparatus further comprises a coriolis flow meter located between the inlet valves and outlet valves, the coriolis flow meter providing a flow signal indicative of flow therethrough. A controller is operative to receive the flow signal and control the valves such that selected inputs of specific liquid fuels are dispensed to at least one of the fuel hoses. In accordance with an exemplary embodiment, the selected inputs of specific liquid fuels may include individual liquid fuels and blended combinations thereof. For example, the specific liquid fuels may include at least two of the following: a first octane gasoline, a second octane gasoline, diesel fuel, biodiesel and ethanol.

Often, the plurality of inlet valves may be configured as proportional valves. In such embodiments, the coriolis flow meter may determine a measured density of a blended combination passing therethrough. The controller will, in turn, operate the inlet valves to maintain the measured density substantially equal to a target density. The outlet valves may be absolute valves.

In some embodiments of the present invention, the controller may be configured to perform automatically a reverse flow purging sequence through the coriolis flow meter between dispensing cycles of different selected liquid fuels and combinations thereof. For example, the apparatus may be adapted to draw fuel vapor behind the liquid fuel passing back through the coriolis flow meter during the reverse flow purging sequence. At least one check valve may be located between a fuel line and a vapor recovery line so that it can be opened to allow vapor fuel therethrough at a predetermined pressure differential.

Another aspect of the present invention provides a method of purging a first liquid fuel in a fuel dispenser having a coriolis flow meter so that a second liquid fuel can be dispensed. One step of the method involves initiating a reverse flow of the first liquid fuel through the coriolis flow meter. The reverse flow is continued until the occurrence of a predetermined event indicating fuel lines have been emptied. For example, the predetermined event may be detection of at least one of air and fuel vapor by the coriolis flow meter. Or, the predetermined event may be detection of a selected quantity of the first liquid fuel during the reverse flow thereof.

In accordance with an additional aspect, the present invention provides an apparatus for dispensing fuel comprising an inlet in fluid communication with a source of liquid fuel. A coriolis flow meter is located downstream of the inlet to measure flow of the liquid fuel and provide a first signal indicative of flow therethrough. An inlet valve operative to allow flow of the liquid fuel into the coriolis flow meter is also provided.

The apparatus further comprises a non-coriolis flow meter located downstream of the inlet which provides a second signal indicative of flow therethrough. A fuel hose and nozzle is located downstream of the coriolis flow meter and said non-coriolis flow meter. A controller is operative to compare the first signal and said second signal to assess accuracy of the non-coriolis flow meter.

A still further aspect of the present invention provides an apparatus for dispensing fuel comprising an inlet pipe in fluid communication with a source of liquid fuel to provide a flow of said liquid fuel therethrough. An air source is operative to inject a gaseous phase component (such as air) into the flow at a selected location therealong. A coriolis flow meter is located downstream of the selected location to measure flow of the liquid fuel. The coriolis flow meter provides a signal indicative of flow therethrough.

In accordance with another aspect, the present invention provides apparatus for dispensing fuel comprising an inlet in fluid communication with a source of liquid fuel. A first manifold is operative to split flow of the liquid fuel from the inlet into first and second parallel braches. First and second coriolis flow meters are located in-line the first and second parallel braches, respectively. A second manifold is operative to combine flow from the first and second parallel braches. A flow valve is operative to permit flow through a hose and nozzle.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
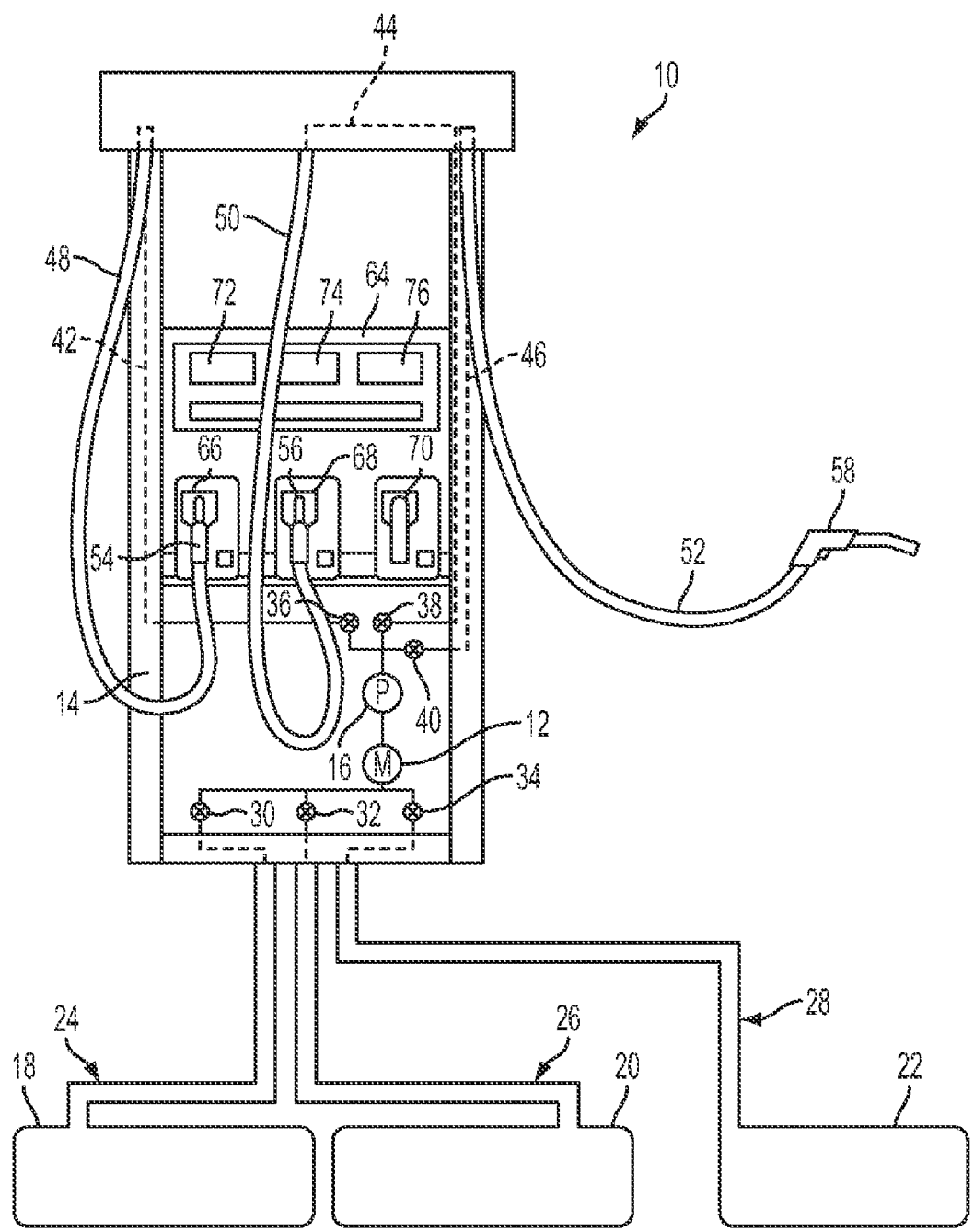
FIG. 1 is a diagrammatic representation of a fuel dispenser in accordance with an embodiment of the present invention drawing three types or grades of fuel from respective storage tanks.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only and is not intended as limiting the broader aspects of the present invention, which broader aspects are embodied in the exemplary constructions.

Fuel dispensing equipment is shown and described in the following U.S. patents, each of which is incorporated herein by reference in its entirety: U.S. Pat. Nos. 6,935,191; 6,253,779; and 5,630,528 for all purposes. Referring to FIG. 1, a fuel dispenser 10 in accordance with an embodiment of the present invention includes a single meter 12 contained in the lower housing 14. A single pump 16, also located in lower housing 14, draws fuel from one or more underground storage tanks (USTs) 18, 20 and 22 through respective pipes 24, 26 and 28. While only a single pump 16 is shown in this example, one skilled in the art will appreciate that a respective pump could be associated with each of the pipes 24, 26 and 28, either inside the dispenser housing or at the location of the respective USTs, such as respective STPs.

Respective inlet valves 30, 32 and 34 are associated with pipes 24, 26 and 28 to control flow into meter 12. Similarly, respective outlet valves 36, 38 and 40 control flow out of pump 16 into respective connecting lines 42, 44 and 46. Connecting lines 42, 44 and 46 are, in turn, in fluid communication with fuel hoses 48, 50 and 52. A respective nozzle 54, 56 and 58 is located at the end of the hoses 48, 50 and 52. A similar set of hoses and nozzles may be located on the opposite side of fuel dispenser 10.

Figure 2:
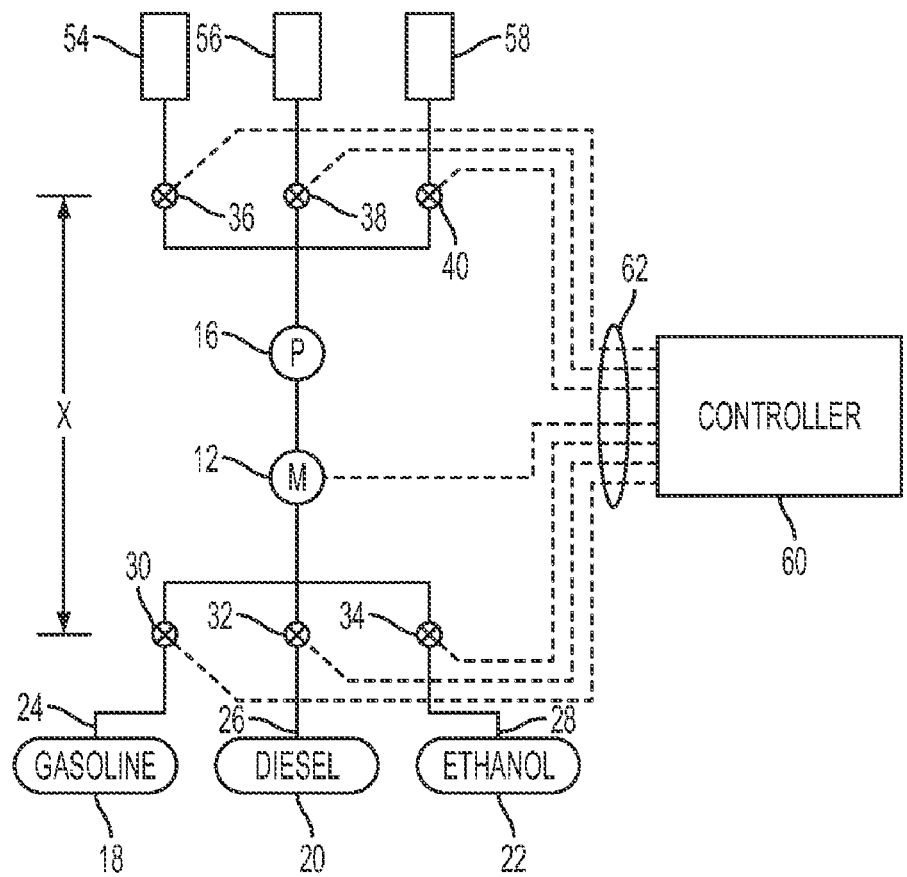
FIG. 2 is a schematic diagram showing aspects of the piping in the fuel dispenser of FIG. 1.

Referring now also to FIG. 2, all of valves 30, 32, 34, 36, 38 and 40, as well as meter 12, are in electrical communication with suitable electronics, such as controller 60. In this case, the electrical communication occurs via wires collectively indicated at 62. Controller 60, preferably in the form of a microprocessor located in the upper portion 64 of the dispenser housing, controls the opening and closing of valves 30, 32 and 34 to ensure that appropriate fuel or fuel mixture flows into meter 12. Similarly, controller 60 controls the opening and closing of valves 36, 38 and 40 so that the fuel or fuel mixture flows into the desired one of hoses 48, 50 and 52 (and thus to its corresponding dispensing nozzle 54, 56 and 58). While a controller in the dispenser housing is described, one skilled in the art will appreciate that a single controller can be used with multiple dispensers, each having one or more meters.

In one example of operation, a customer selects a desired grade of fuel by lifting a nozzle 54, 56 or 58 from its respective boot 66, 68 or 70. In some embodiments, the customer then lifts a lever, generally located in the boot, which initializes the pump display and measuring systems. As is known in the art, the customer may initiate credit or debit verification, cash acceptance, or fuel presets before operating the lever.

Operation of the lever causes controller 60 to open and close the appropriate valves such that the desired grade and/or type of fuel will be dispensed. During this time, meter 12 provides a signal to controller 60 from which the quantity of fuel dispensed can be determined (or the signal may directly indicate the quantity if the meter has sufficient on-board processing), and that quantity is shown on the corresponding display devices 72, 74 and 76. Once dispensing is finished, the nozzle is replaced in the boot 73, thereby deactivating the lever.

It can thus be seen that this embodiment contemplates a single meter for use with a plurality of grades and/or types of fuel feeding into multiple nozzles. Preferably, meter 12 will be a coriolis mass flow meter. Such meters determine the mass flow by detecting motion of a vibrating conduit. In particular, the conduit is driven at a selected frequency by an electromechanical actuator. Motion of the conduit is measured at specific locations along its length and this information can be used to determine mass flow. Details regarding the structure and operation of a coriolis flow meter are provided in U.S. Pat. Nos. 7,287,438 and 7,472,606, both of which are incorporated herein by reference in their entirety for all purposes.

Coriolis flow meters have various characteristics that may be advantageous in a fuel dispensing environment. For example:

1. Coriolis flow meters are highly accurate.
2. Coriolis flow meters have no moving parts, so they are not subject to significant wear or drift.
3. They can measure flow in both forward and backward directions.
4. A coriolis flow meter measures density directly. Thus, if a target density of a blended fuel is known, a single coriolis meter can be used (rather than two meters) to do accurate blending.

In addition, coriolis flow meters compensate for volume differences due to temperature because they measure mass directly. A coriolis flow meter can also detect "irregular fuels," i.e., the presence of water or dirt. Moreover, because a coriolis meter can "see" pressure changes, maintenance issues such as the imminent failure of a pump or a clogging of a filter can be detected.

Referring now again to FIG. 2, it will be appreciated that principles of the present invention can be utilized to dispense different grades and/or types of fuel using a single meter. In the case of different grades, for example, a desired blending ratio could be achieved in the field by running a first grade (e.g., low octane) for a short time. Then a second grade (e.g., high octane) is run for a short time. As a result, meter 12 (and controller 60) can determine the densities of each. Then controller 60 calculates the target density of the desired blend. During operation, meter 12 measures actual density and controls the valves to keep actual density and target density as close as possible.

As noted above, different types of fuels can also be dispensed using a single meter. In the case illustrated in FIG. 2, for example, UST 18 contains gasoline, UST 20 contains diesel fuel and UST 22 contains ethanol. Under the control of controller 60, the valving system can be used to dispense the types of fuel individually, or gasoline-ethanol blends in desired ratios.

One skilled in the art will appreciate that the fluid contained in the piping X between the valves would be considered a contaminant when switching from one grade and/or type of fuel to another. (As used herein, the terms "pipe," "piping" and "conduit" shall be deemed to include both rigid and flexible piping and/or hoses, whereas the term "hose" refers to a flexible hose.) But the volume of this fluid is known because the interior volume of this section of piping is known. As noted above, a coriolis flow meter can measure flow in the reverse direction. So a reverse flow can be used to purge the "contaminant" (possibly back to the original UST in the case of unblended fuel). For example, the controller can be configured to reverse until a set volume has been returned. Or, because a coriolis meter determines density, until air is detected.

Figure 3:
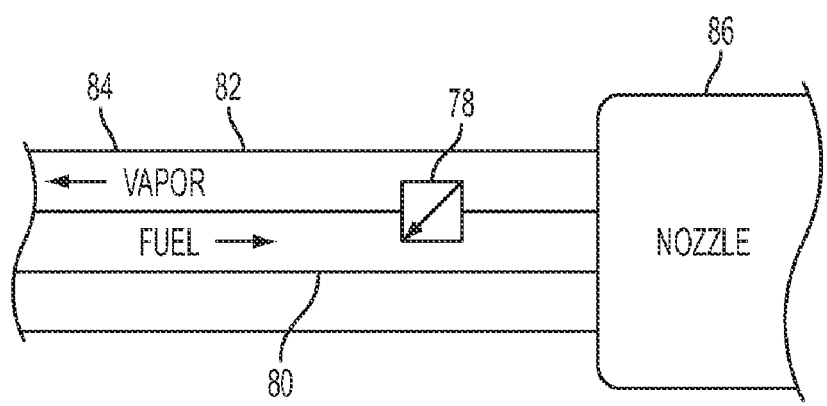
FIG. 3 is a diagrammatic representation showing the use of a check valve between a fuel line and vapor recovery line for use in a purging sequence.

If the fuel dispensing equipment is equipped for vapor recovery, FIG. 3 illustrates a modification that can be used to facilitate the purging process described above. In this case, a check valve 78 is provided between the fuel and vapor conduits 80 and 82 of a vapor recovery hose 84 (or at another appropriate location in the vapor recovery piping). If the flow valve in nozzle 86 is shut-off, check valve 78 can open during purging so that vapor is drawn in behind the purged liquid.

Figure 4:
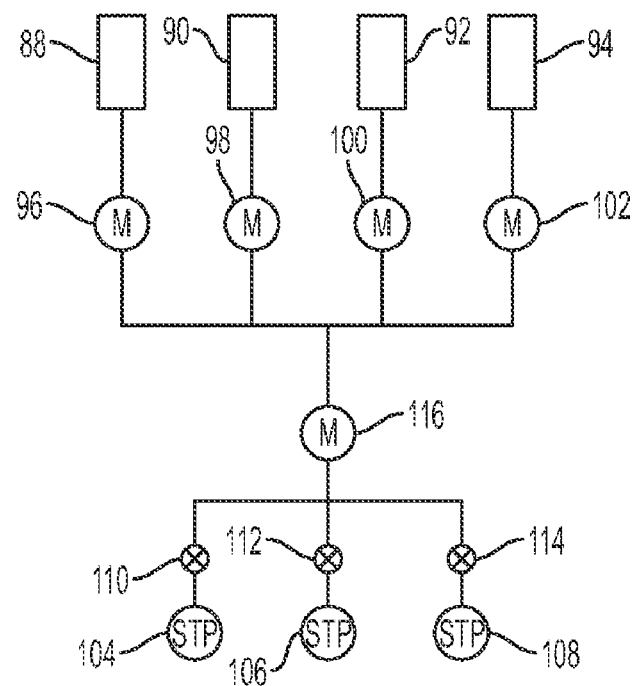
FIG. 4 is a schematic diagram showing a piping arrangement in accordance with another aspect of the present invention.

FIG. 4 illustrates a further embodiment where flow to respective nozzles 88, 90, 92 and 94 is measured by respective meters 96, 98, 100 and 102, such as conventional inferential meters. Different types and/or grades of fuel are drawn from respective USTs by respective STPs 104, 106 and 108 through valves 110, 112 and 114. In this case, however, a single coriolis meter 116 is used to calibrate and/or validate the output of the other meters. If the outputs are substantially different, for example, this may indicate the occurrence of fuel theft and tampering with the conventional meter. For calibration, meters in the field could be roughly calibrated versus one central reference meter. Calibration information could be updated automatically via internet, or peer to peer in nearby site locations.

Figure 5:
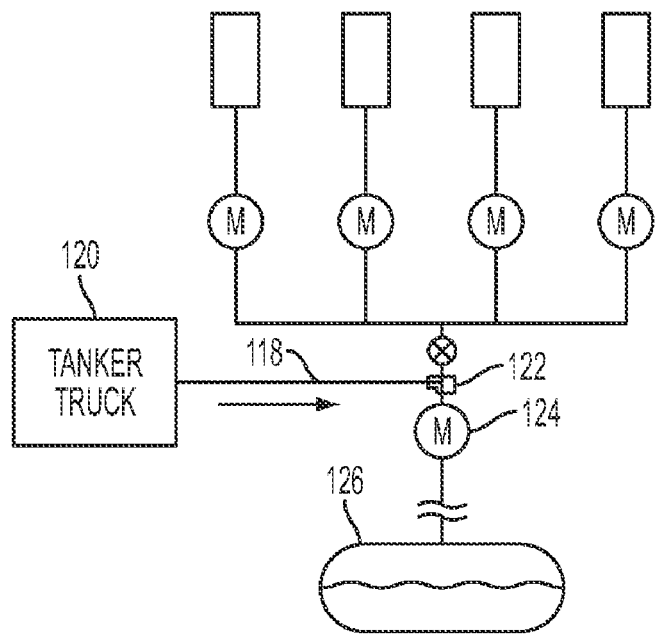
FIG. 5 is a schematic diagram showing a piping arrangement in accordance with another aspect of the present invention.

FIG. 5 illustrates an embodiment where the refilling hose 118 of a tanker truck 120 is tapped into a connection tee 122 of on-site fuel dispensing equipment. In this case, the fuel being supplied by tanker truck 120 is fed through coriolis flow meter 124 as it is delivered to a UST 126. Flow meter 124 may be used in addition to or in lieu of the flow meter on the truck itself. In addition, coriolis flow meters are well-suited to measure energy units of the fuel supplied which may become an accepted basis of measurement in the future rather than volume for certain types of fuel such as ethanol.

Figure 6:
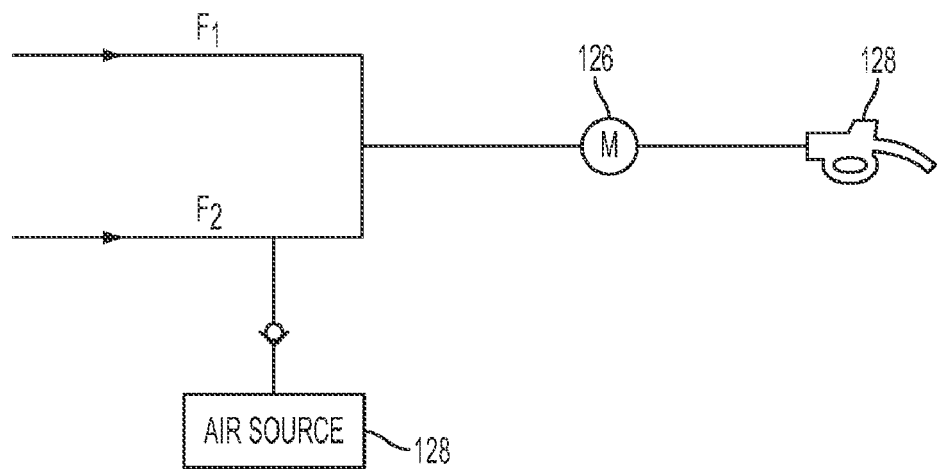
FIG. 6 is a schematic diagram showing a piping arrangement in accordance with another aspect of the present invention.

FIG. 6 illustrates an embodiment where two grades and/or types of fuel (represented by respective flows $F_1$ and $F_2$) are being blended and measured by a single coriolis flow meter 126 for delivery via a nozzle 128. In this case, however, an air source 128 is being utilized to add air to one of the liquids ($F_2$). This enhances the density difference between the two fuels so that ratio control is facilitated.

The addition of air is not a problem from the customer's standpoint, however, because coriolis flow meter 126 measures the mass of the dispensed fuel and thus does not "sell" the air. In fact, the addition of air may be desirable because it displaces vapor in the customer's vehicle fuel tank which can be recovered with vapor recovery fuel dispensing equipment. Moreover, the use of a coriolis flow meter potentially allows the complete elimination of air separation systems that are now typically required in fuel dispensing equipment, or a less costly (threshold detecting) air separation system could be used.

A coriolis flow meter can also be used in various ways to facilitate leak detection. For example, the meter itself could be enclosed so that a vacuum can be drawn in the interstitial space. The vacuum level is monitored and, if lost, this indicates a leak at the meter itself. In addition, the meter can determine in a suction (fuel pump) system whether a leak has occurred. Specifically, if more air is being sucked in due to the leak, this is detected.

Figure 7:
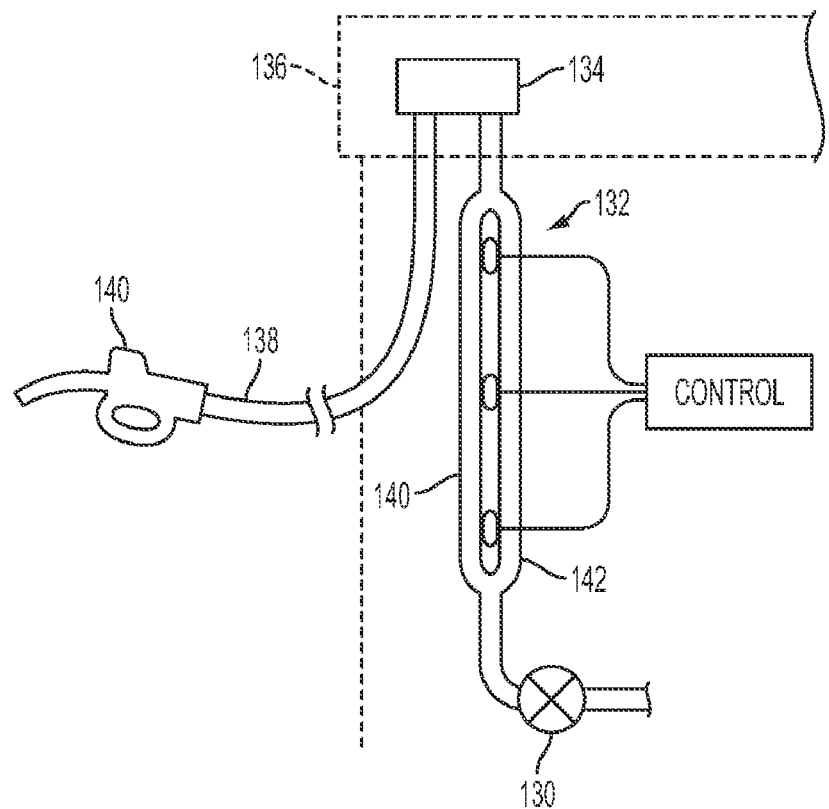
FIG. 7 is a diagrammatic representation showing incorporation of a coriolis flow meter into a fuel column of a fuel dispenser in accordance with another aspect of the present invention.

The physical nature of a coriolis flow meter permits it to be placed in various locations in the fuel dispensing equipment. In fact, portions of the fuel dispenser used for other purposes can be modified to also function as a coriolis flow meter. This is illustrated in FIG. 7, where fuel supplied when valve 130 is opened flows through a dispensing column 132 to a connector block 134 located in the dispenser's canopy 136. A fuel hose 138 has one end attached at connector block 134 to be in fluid communication with column 132. A nozzle 140 is located at the other end of fuel hose 138.

As can be seen, column 132 has been modified so that it splits into two flow conduits 140 and 142. A driving actuator and a pair of pick-off transducers are in electrical communication with a controller 144 to form the coriolis flow meter. In addition, various forms of multichamber coriolis tubes are also contemplated in accordance with the present invention. Fluid could be passed through one or more of the chambers, with still fluid being located in the others. With the fluid moving in one, a frequency sweep could be performed to find a new natural frequency, at which the exciter could be reset to drive for enhanced signal-to-noise performance. One or more accelerometers could also be located on the pipes to help find the natural frequency.

As noted above, fuel volume or flow rate measurement technologies are typically limited in their measurement accuracies across a finite range of flow rates. The present invention provides apparatus and methods whereby the maximum flow rate restrictions of a particular measurement technology are overcome. Specifically, for coriolis metering, primary maximum flow rate limitation is bore size as correlated to a minimum acceptable specified accuracy at a minimum specified flow rate.

Figure 8:
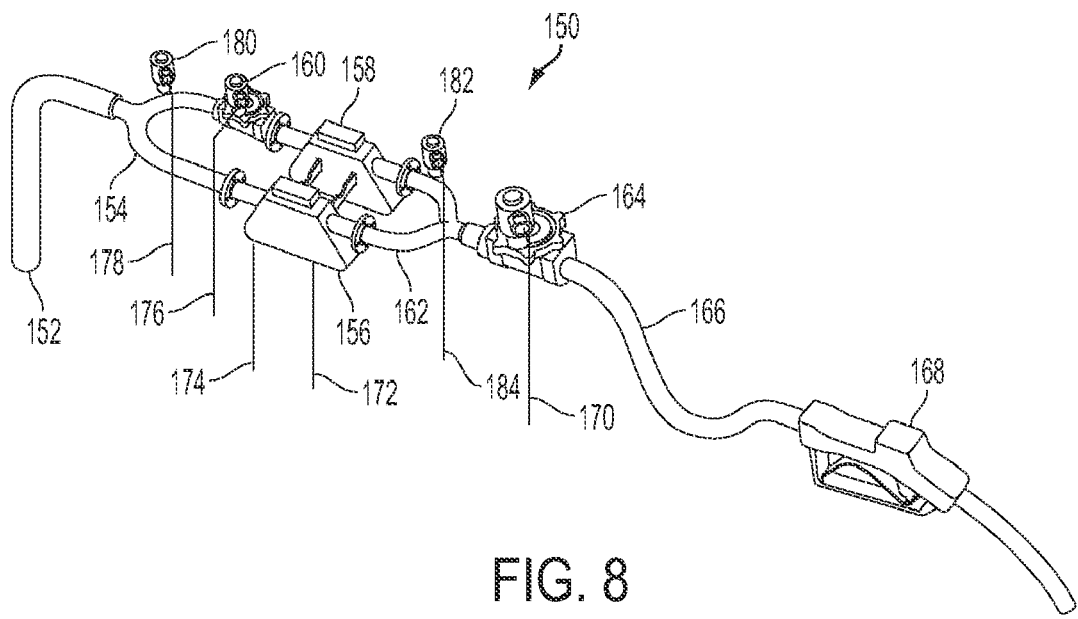
FIG. 8 is a schematic diagram showing a piping arrangement in accordance with another aspect of the present invention.

In this regard, FIG. 8 illustrates a system 150 having a fuel inlet 152 sourcing fuel to meter inlet manifold 154. Manifold 154 sources fuel flow to respective coriolis meters 156 and 158. A control valve 160 is located in series with and situated between manifold 154 and meter 158 so as to control fuel flow into meter 158.

The sum flow output of meters 156 and 158 is combined by manifold 162 and sourced to the inlet of a control valve 164. The outlet of control valve 164 is ultimately coupled to delivery hose 166 so as to convey fuel to fuel-dispensing nozzle 168.

Control valve 164 may be of the type that is electrically actuated by solenoid, which receives energy by means of valve actuation signal supplied at electrical line 170. In this embodiment, control valve 164 may either be absolute (gating fully open or closed) or proportional (gating fully open or closed, or any fraction thereof). Control valve 164 may be employed as a master valve to permit or deny dispensing operation. While permitting, control valve 164 may be used to regulate flow rate for a variety of purposes, such as including but not limited to regulating the maximum permitted flow rate by regulatory agencies such as the EPA to prevent nozzle splash back.

Meters 156 and 158 serve to quantify fuel volume traversing from inlet to outlet, outputted electrically via measured volume signals at lines 172 and 174, respectively. The signals of output lines 172 and 174 are supplied to an appropriate electronic controller for valve control and other purposes. Alternatively, meters 156 and 158 serve to quantify fuel flow rate traversing from inlet to outlet, outputted electrically via measured rate signals at lines 172 and 174. The electronic controller may then integrate flow rate over a finite or variable interval t to derive volume; or alternatively, the integration may occur within the localized meter electronics itself.

Control Valve 160 may be of the type that is electrically actuated by solenoid, which receives energy by means of a valve actuation signal at line 176. In this embodiment, control valve 160 may either be absolute (gating fully open or closed) or proportional (gating fully open or closed, or any fraction thereof).

In an alternate embodiment, control valve 160 may be actuated by fluidic pressure differential respective to valve inlet vs. outlet, typically comprising a finite surface area impinged upon by a force such as a spring, whereas a predetermined threshold overcomes the impinged force and thus permits flow. In this latter embodiment, output line 178 may instead provide a valve status signal 54, thereby providing indicia of actuation by pressure and corresponding flow.

System 150 may include pressure transducer 180 at or proximate to meter inlet manifold 154 to measure meter inlet pressure. A pressure transducer 182 at or proximate to meter outlet manifold 162 may be provided to measure meter outlet pressure. Pressures as measured by pressure transducers 180 and 182 are conveyed to an electronic controller via output lines 178 and 184, respectively. Whereas the pressures measured at each transducer are absolute for their location, nevertheless the algebraic subtraction of the two pressure signals may be performed and utilized to determine the pressure drop across meter 156 and/or meter 158. Alternatively, system 150 may include a single differential-type pressure transducer such that one port of the differential pressure transducer connects at or proximate to meter inlet manifold 154, and the second port of the differential pressure transducer connects at or proximate to meter outlet manifold 162.

System 150 may be configured such that when a minimum threshold of pressure drop across meters 156 and 158 is detected, valve 160 closes or otherwise restricts flow such that all or predominate flow occurs through meter 156. In addition, system 150 may be structured such that when a maximum threshold of pressure drop across meter 156 is detected, valve 160 opens or otherwise permits flow such that flow is divided or shared across both meters 156 and 158.

Figure 9:
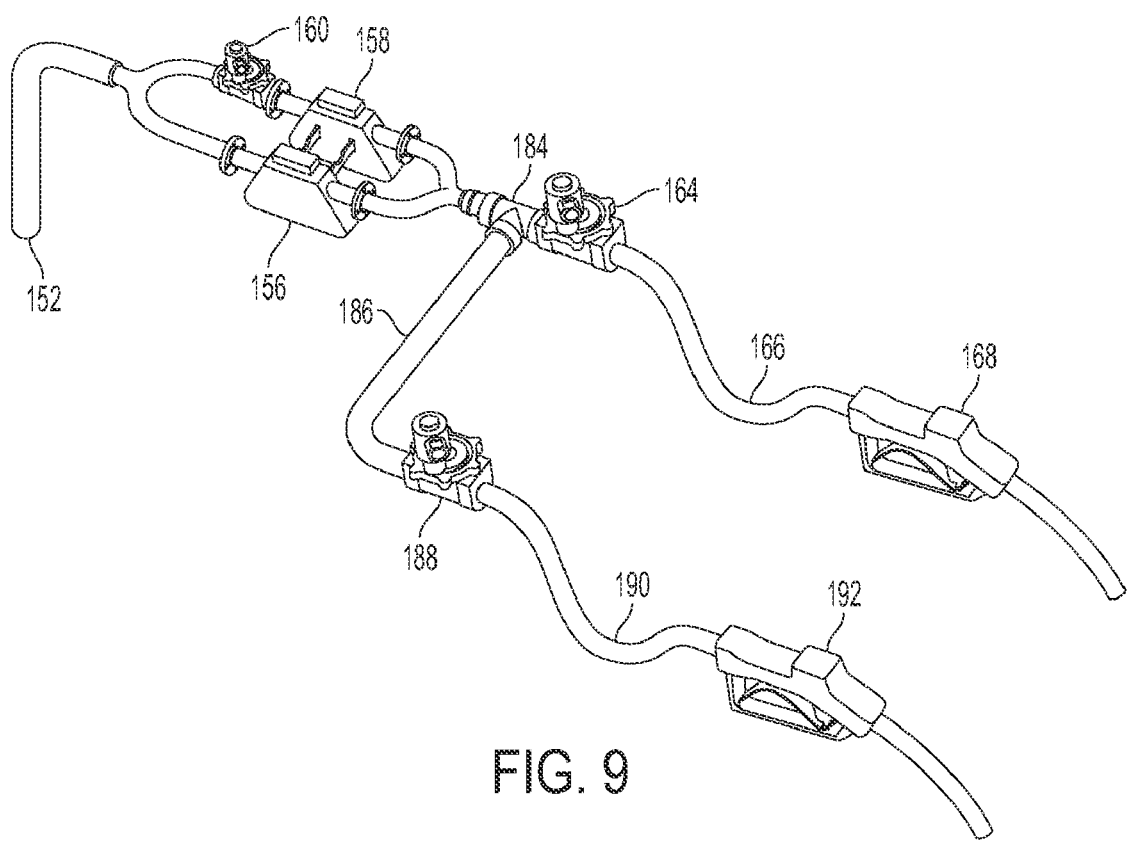
FIG. 9 is a schematic diagram showing a piping arrangement in accordance with another aspect of the present invention.

FIG. 9 illustrates an embodiment where the additional flow range permitted by the embodiment of FIG. 8 is modified for use in a master-satellite dispensing system. In particular, a large tee connector 184 is located adjacent valve 164 for the attachment of satellite piping 186. A satellite valve 188 controls flow to a hose 190 and nozzle 192.

Figure 10:
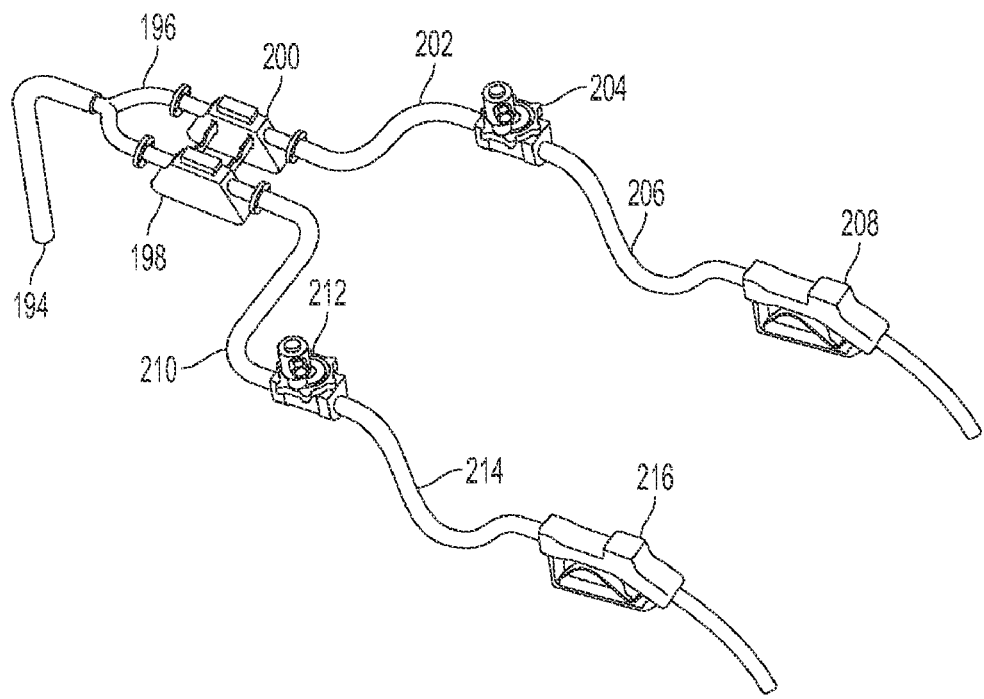
FIG. 10 is a schematic diagram showing a piping arrangement in accordance with another aspect of the present invention.

FIG. 10 illustrates an alternative master-satellite configuration. In this case, fuel is fed through an inlet 194 to a manifold 196. Manifold 196 splits the flow through respective coriolis flow meters 198 and 200. The output of meter 200 is fed via piping 202 to a valve 204. Valve 204 controls flow to a hose 206 and master nozzle 208. Similarly, the output of meter 198 is fed via piping 210 to a valve 212. Valve 212 controls flow to a hose 214 and satellite nozzle 216.

Figure 11:
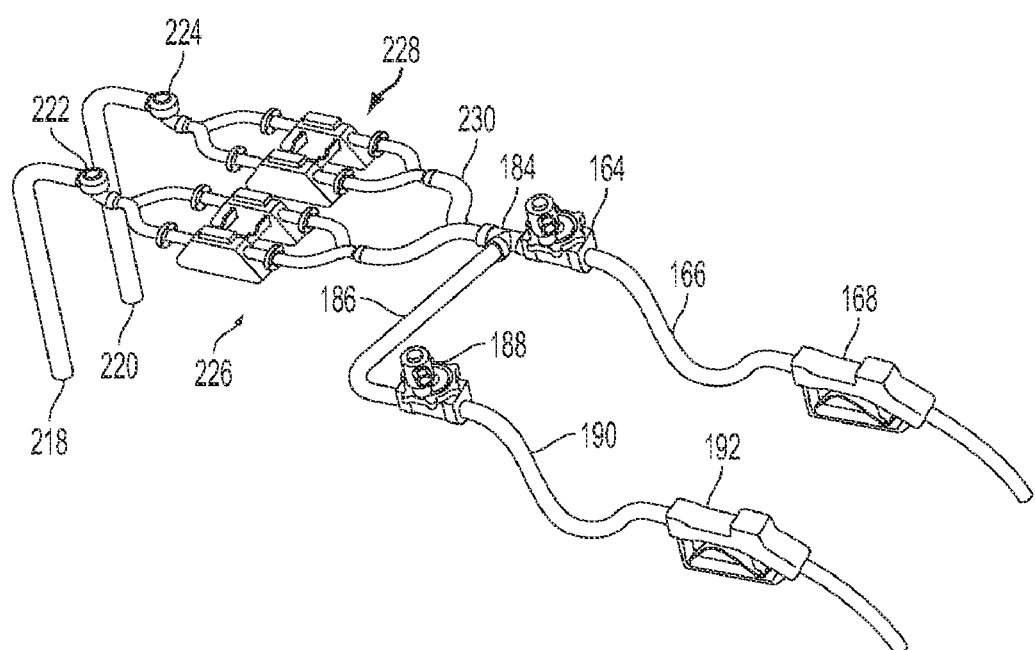
FIG. 11 is a schematic diagram showing a piping arrangement in accordance with another aspect of the present invention.

FIG. 11 illustrates an embodiment similar to FIG. 9, but which includes first and second inlets 218 and 220 for respective fuel grades and/or types. A respective proportional valve 222 and 224 is associated with each of the inlets 218 and 220. Valves 222 and 224 are controlled so as to achieve the desired blending ratio. A coriolis flow meter pair 226 is associated with inlet 218. Similarly, a coriolis flow meter pair 228 is associated with inlet 220. Meter pairs 226 and 228 feed to a manifold 230 where their outputs are combined. Meter pairs are used in this embodiment to provide higher flow rates than could typically be achieved with a single meter.

Figure 12:
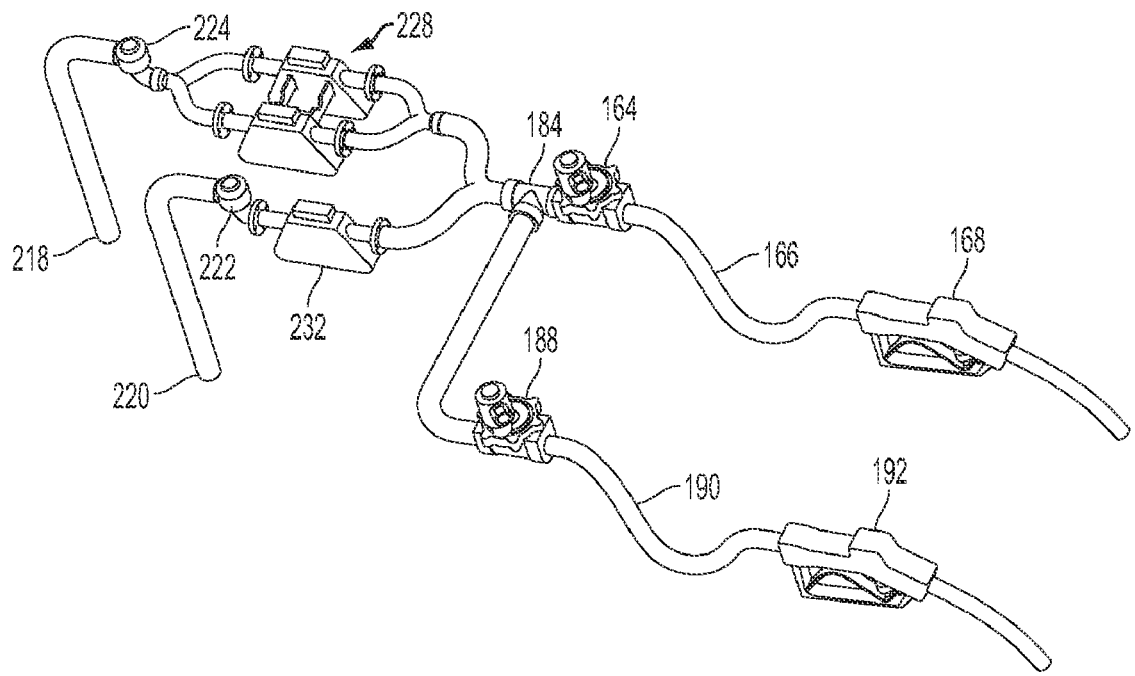
FIG. 12 is a schematic diagram showing a piping arrangement in accordance with another aspect of the present invention.

FIG. 12 illustrates an embodiment similar to FIG. 11, but in which the flow rates of the second grade and/or type of fuel are such that a single coriolis flow meter 232 can be used. For example, the first grade supplied through inlet 218 might be diesel, whereas the second grade supplied through inlet 220 might be biodiesel up to 50% max blend.

In contrast to the high flow embodiments of FIGS. 8-12, FIG. 13 illustrates standard flow using coriolis flow meters 234 and 236 associated with respective nozzles 238 and 240 for different grades and/or types of fuel. In particular, one grade or type of fuel is supplied through inlet 242 under control of a valve 244. The fuel passes through meter 234, then to hose 246 and nozzle 238. Another grade or type of fuel is supplied through inlet 248 under control of a valve 250. The fuel passes through meter 236, then to hose 252 and nozzle 240.

Figure 14:
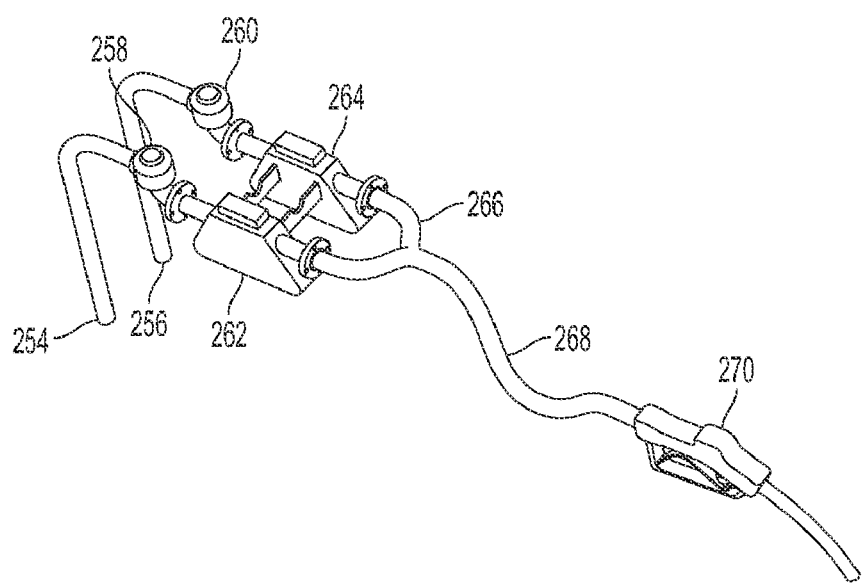
FIG. 14 is a schematic diagram showing a piping arrangement in accordance with another aspect of the present invention.
Figure 13:
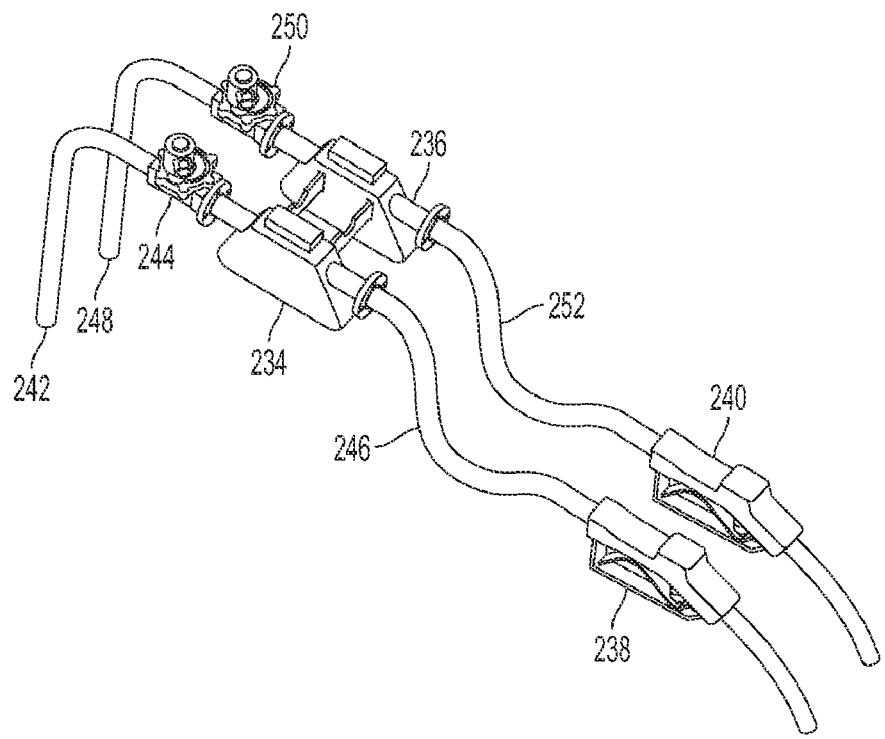
FIG. 13 is a schematic diagram showing a piping arrangement in accordance with another aspect of the present invention.

FIG. 14 illustrates an embodiment for blending at standard flow rates. Respective grades and/or types of fuel are fed into inlets 254 and 256. Proportional valves 258 and 260 control the flow so as to achieve the desired blending ratio. Respective coriolis flow meters 262 and 264 measure the flow of each type and/or grade in this embodiment. The outputs of the flow meters are combined at a manifold 266, fed to a hose 268 and then to nozzle 270.

Figure 15:
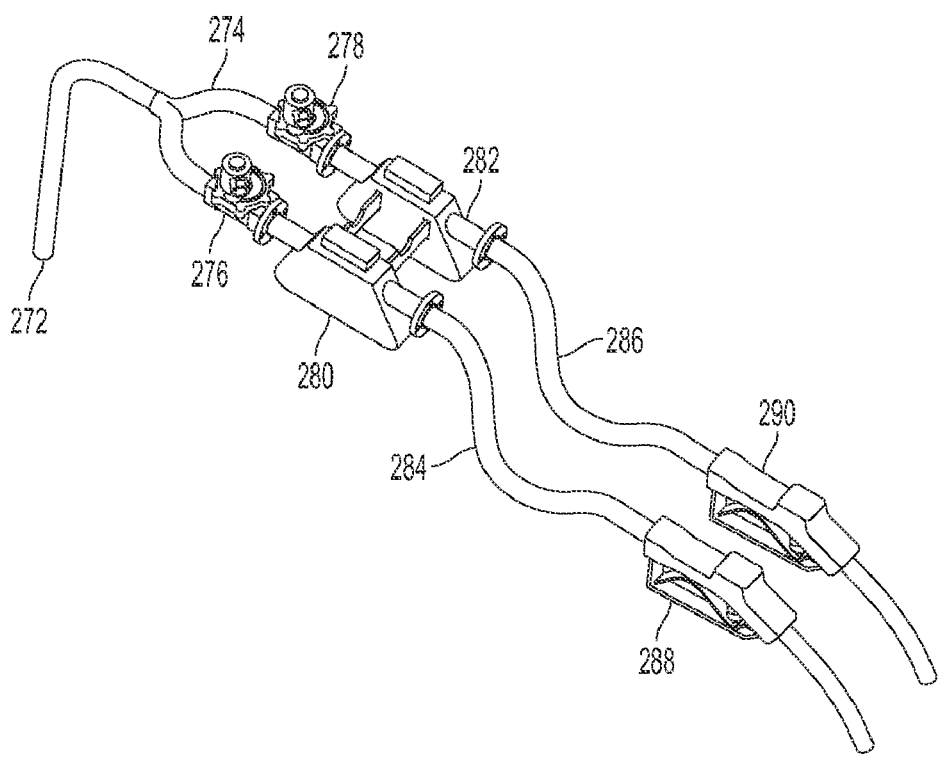
FIG. 15 is a schematic diagram showing a piping arrangement in accordance with another aspect of the present invention.

FIG. 15 illustrates an embodiment for providing a single grade at two sides of a fuel dispenser. In particular, the fuel is supplied through a single inlet 272 and split at manifold 274. The two branch lines each have respective valves 276 and 278, meters 280 and 282, hoses 284 and 286, and nozzles 288 and 290.

It should be understood that aspects of various embodiments may be interchanged both in whole or in part. For example, elements of one embodiment may be combined with elements of other embodiments to yield still further embodiments. Furthermore, those of ordinary skill in the art will appreciate that the foregoing description is by way of example only, and is not intended to be limitative of the invention.

What is claimed is:

1. Apparatus for dispensing liquid fuel, said apparatus comprising:
    a plurality of inlet valves, each of said inlet valves being a proportional valve and connected in-line with a respective inlet pipe in fluid communication with a respective source of specific liquid fuels;
    a plurality of outlet valves, each of said outlet valves connected in-line with a respective outlet pipe;
    a respective fuel hose in fluid communication with each of said outlet pipes;
    a coriolis flow meter located between said plurality of inlet valves and said plurality of outlet valves, said coriolis flow meter providing a flow signal indicative of flow and information indicative of measured density of fluid passing therethrough; and
    a controller operative to receive said flow signal and control said valves such that selected inputs including blended combinations of said specific liquid fuels are dispensed to at least one of said fuel hoses, said controller operating said inlet valves to maintain said measured density substantially equal to a target density.

2. Apparatus for dispensing fuel as set forth in claim 1, wherein said outlet valves are absolute valves.

3. Apparatus for dispensing fuel as set forth in claim 1, further comprising a single pump located between said plurality of inlet valves and said plurality of outlet valves.

4. Apparatus for dispensing fuel as set forth in claim 3, wherein said single pump is located downstream of said coriolis flow meter.

5. Apparatus for dispensing fuel as set forth in claim 1, wherein said specific liquid fuels include at least two of the following: a first octane gasoline, a second octane gasoline, diesel fuel, biodiesel and ethanol.

6. Apparatus for dispensing fuel, said apparatus comprising:
    a plurality of inlet valves, each of said inlet valves connected in-line with a respective inlet pipe in fluid communication with a respective source of specific liquid fuels;
    a plurality of outlet valves, each of said outlet valves connected in-line with a respective outlet pipe;
    a respective fuel hose in fluid communication with each of said outlet pipes;
    a coriolis flow meter located between said plurality of inlet valves and said plurality of outlet valves, said coriolis flow meter providing a flow signal indicative of flow therethrough; and
    a controller operative to receive said flow signal and control said valves such that selected inputs of said specific liquid fuels are dispensed to at least one of said fuel hoses,
    wherein said controller is operative to perform automatically a reverse flow purging sequence through said coriolis flow meter between dispensing cycles of different ones of said selected liquid fuels and combinations thereof and wherein said apparatus is adapted to draw fuel vapor behind said liquid fuel passing back through said coriolis flow meter during said reverse flow purging sequence.

7. Apparatus for dispensing fuel as set forth in claim 6, further comprising at least one check valve located between a fuel line and a vapor recovery line, said check valve being opened to allow vapor fuel therethrough at a predetermined pressure differential.

8. A method of purging a first liquid fuel in a fuel dispenser having a coriolis flow meter so that a second liquid fuel can be dispensed, said method comprising steps of:
    initiating a reverse flow of said first liquid fuel through said coriolis flow meter; and
    continuing said reverse flow until the occurrence of a predetermined event indicating fuel lines have been emptied,
    wherein said predetermined event is detection of at least one of air and fuel vapor by said coriolis flow meter; and
    wherein said fuel dispenser is a vapor recovery fuel dispenser adapted to supply fuel vapor behind said first liquid fuel during said reverse flow.

9. A method as set forth in claim 8, wherein said vapor recovery fuel dispenser includes at least one check valve between a fuel line and a vapor recovery line thereof to supply said fuel vapor behind said first liquid fuel.

10. A method of purging a first liquid fuel in a fuel dispenser having a coriolis flow meter so that a second liquid fuel can be dispensed, said method comprising steps of:
    initiating a reverse flow of said first liquid fuel through said coriolis flow meter; and
    continuing said reverse flow until the occurrence of a predetermined event indicating fuel lines have been emptied,
    wherein said predetermined event is detection of a selected quantity of said first liquid fuel during said reverse flow thereof.

11. Apparatus for dispensing fuel, said apparatus comprising:
    an inlet in fluid communication with a source of liquid fuel;
    a coriolis flow meter located downstream of said inlet to measure flow of said liquid fuel, said coriolis flow meter providing a first signal indicative of flow therethrough;
    an inlet valve operative to allow flow of said liquid fuel into said coriolis flow meter;
    a non-coriolis flow meter located downstream of said inlet, said non-coriolis flow meter providing a second signal indicative of flow therethrough;
    a fuel hose and nozzle located downstream of said coriolis flow meter and said non-coriolis flow meter; and
    a controller operative to compare said first signal and said second signal to assess accuracy of said non-coriolis flow meter.

12. Apparatus as set forth in claim 11, wherein said non-coriolis flow meter is located downstream of said coriolis flow meter.

13. Apparatus as set forth in claim 12, comprising a single coriolis flow meter and a plurality of said non-coriolis flow meters located downstream thereof along respective branch pipes.

14. Apparatus for dispensing fuel, said apparatus comprising:
   an inlet pipe in fluid communication with a source of liquid fuel to provide a flow of said liquid fuel therethrough;
   an air source operative to inject a gaseous phase component into said flow at a selected location therealong;
   a coriolis flow meter located downstream of said selected location to measure flow of said liquid fuel, said coriolis flow meter providing a signal indicative of flow therethrough.

15. An apparatus as set forth in claim 14, wherein said gaseous component is air.

16. Apparatus for dispensing fuel, said apparatus comprising:
   an inlet in fluid communication with a source of liquid fuel;
   a first manifold operative to split flow of said liquid fuel from said inlet into first and second parallel branches;
   first and second coriolis flow meters in-line said first and second parallel branches, respectively;
   a second manifold operative to combine flow from said first and second parallel branches;
   a hose and nozzle; and
   a flow valve operative to permit flow through said hose and nozzle.

17. Apparatus for dispensing fuel as set forth in claim 16, further comprising a valve to permit flow through only said first coriolis flow meter and through both of said first and second coriolis flow meters depending on flow requirements.

18. Apparatus for dispensing fuel as set forth in claim 17, wherein said flow requirements are determined by pressure drop across said first and second manifolds.

\* \* \* \* \*